(12) United States Patent
Beard

(10) Patent No.: US 11,230,311 B1
(45) Date of Patent: *Jan. 25, 2022

(54) AVALANCHE SLIDE DETECTION SYSTEM AND METHOD

(71) Applicant: BNSF Railway Company, Fort Worth, TX (US)

(72) Inventor: Mitchell Beard, Shawnee, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,426

(22) Filed: May 3, 2021

Related U.S. Application Data

(63) Continuation of application No. 16/924,694, filed on Jul. 9, 2020, now Pat. No. 11,059,502.

(51) Int. Cl.
| | |
|---|---|
| *B61L 23/04* | (2006.01) |
| *G01C 9/00* | (2006.01) |
| *G08B 21/18* | (2006.01) |
| *B61L 1/20* | (2006.01) |
| *G08B 21/10* | (2006.01) |

(52) U.S. Cl.
CPC ............. *B61L 23/041* (2013.01); *B61L 1/20* (2013.01); *G01C 9/00* (2013.01); *G08B 21/10* (2013.01); *G08B 21/182* (2013.01)

(58) Field of Classification Search
CPC .......... B61L 1/20; B61L 23/041; G01C 9/00; G08B 21/10; G08B 21/182; G08B 19/02; A63C 5/06; B60C 27/06; B64D 15/20; C01B 32/55; G01N 23/083; G01N 23/12; G01P 13/02; G01P 5/14; G01W 1/14; G03G 15/0921; H05B 3/84

USPC ....... 340/689, 690, 540, 601, 603, 686, 612, 340/668, 665, 932.2, 436
See application file for complete search history.

(56) References Cited

U.S. PATENT DOCUMENTS

| | | | | | |
|---|---|---|---|---|---|
| 4,300,121 A | * | 11/1981 | Fritzsche | ............... | G08B 21/10 340/601 |
| 5,661,464 A | * | 8/1997 | Bilak | ..................... | G08B 21/10 340/690 |

(Continued)

FOREIGN PATENT DOCUMENTS

| | | |
|---|---|---|
| CN | 10731949 A | 11/2017 |
| GB | 2074315 A | 10/1981 |
| WO | 2001051930 A2 | 7/2001 |

OTHER PUBLICATIONS

ALPUG; Avalanche Warning Systems; Product Data Sheet; 8 pages; 2004; www.Alpug.ch.

(Continued)

*Primary Examiner* — Daniel Previl
(74) *Attorney, Agent, or Firm* — Enrique Sanchez; Whitaker Chalk Swindler & Schwartz, PLLC

(57) ABSTRACT

An impact detection tower is disclosed that can facilitate a reliable method of avalanche detection, related to the maintenance and monitoring a railway system. The avalanche detection system can include a plurality of impact detection towers comprising sensors in operable communication with a gateway configured to utilize data transmitted from the sensors to determine if an avalanche has occurred. The gateway can be in operable connection with a human-machine interface to facilitate monitoring of the system by a railroad engineer.

20 Claims, 6 Drawing Sheets

(56) References Cited

U.S. PATENT DOCUMENTS

| | | | |
|---|---|---|---|
| 6,119,535 | A | 9/2000 | Tambo et al. |
| 6,863,246 | B2 | 3/2005 | Kane et al. |
| 11,059,502 | B1* | 7/2021 | Beard .................. B61L 23/041 |
| 2002/0194922 | A1 | 12/2002 | Schaefer et al. |
| 2004/0069909 | A1 | 4/2004 | Kane et al. |
| 2006/0243931 | A1* | 11/2006 | Haran ................ G01N 21/8901 |
| | | | 250/574 |
| 2008/0008543 | A1* | 1/2008 | Hendrie .................. E01F 7/04 |
| | | | 405/302.4 |
| 2011/0118913 | A1 | 5/2011 | Pretorius et al. |
| 2012/0235815 | A1 | 9/2012 | Coveley et al. |
| 2018/0190042 | A1* | 7/2018 | Gordon ................ G07C 5/0808 |
| 2020/0329789 | A1 | 10/2020 | Cholhan et al. |

OTHER PUBLICATIONS

Notice of References Cited by Examiner; U.S. Appl. No. 16/924,694; 1 page; Jan. 19, 2021.

Notice of References Cited by Examiner; U.S. Appl. No. 16/924,694; 1 pages; Apr. 15, 2021.

Notice of References Cited by Examiner; U.S. Appl. No. 16/924,694; 1 pages; Sep. 17, 2020.

Information Disclosure Statement by Applicant; U.S. Appl. No. 16/924,694; 4 pages; Jul. 9, 2020.

LB Foster; Avalanche Detection System; Product Data Sheet; 4 pages; 2019 www.lbfost.com.

Wyssen Avalanche Control; LARA® Long Range Avalanche Radar; 2018; Product page; 1 page; www.wyssenavalanche.com.

* cited by examiner

AVALANCHE SLIDE DETECTION SYSTEM AND METHOD

CROSS-REFERENCE TO RELATED APPLICATIONS

The present application is a Continuation of Application of U.S. patent application Ser. No. 16/924,694, filed Jul. 9, 2020, the entirety of which is herein incorporated by reference.

TECHNICAL FIELD

The present disclosure generally relates to damage detection and response in railroad asset management and maintenance.

BACKGROUND

Rail transport systems traverse entire continents to enable the transport and delivery of passengers and goods throughout the world. A quintessential component of railroad infrastructure is the railroad track. Laid over a myriad of geographies and terrains, railroad tracks are designed to withstand the worst of the elements and facilitate the movement of locomotives throughout the railroad system. Because of this constant exposure of the tracks to hazardous conditions, railroad companies must be vigilant in maintaining track integrity; if a section of track is compromised and the damage or obstruction is not quickly addressed, the consequences can be catastrophic.

Sections of track that are particularly at risk are those laid in mountain ranges. Because of high snowfall and drastic changes in elevation, railroad tracks that span mountain ranges are at the highest risk of being impacted by avalanches. Avalanches are unpredictable, abrupt, and potentially devastating to railroad infrastructure. An avalanche can bury railroad tracks in snow and debris, obstructing the path of a travelling locomotive. Such obstruction can affect the safe movement of trains, resulting in train derailment or damage to locomotives. However, predicting when an avalanche might occur can be an extremely difficult and inexact science, and responding in a timely and appropriate manner can be even more difficult. Railroad companies must constantly be wary of potential avalanches at any one point along thousands of miles of railroad tracks laid in one of the world's most precarious environments. As such, simply detecting when an avalanche occurs is a challenge in-and-of itself.

Some traditional avalanche detection methods focus on movement in snowpack to determine if an avalanche will occur or has occurred. For example, javelin-like sensors and probes can be inserted into snowpack and detect shifts that may be indicative of an avalanche. However, while useful, the high potential for false alarms renders snowpack monitors impractical for monitoring avalanche obstruction in railroad infrastructure. For example, wildlife movement can cause shifts in snowpack and trigger sensors, and there are also instances when an avalanche does not pose a danger to train operations; minimal snow deposit on the track does not hinder locomotives. As such, relying on known snowpack monitoring technology can result in false alarms causing needless train delay and railroad network bottlenecks. False alarms not only cause needless train delay, they can also result in train crew complacency—over time in active avalanche areas, continuous false alarms can condition railway personnel to doubt the validity of a given avalanche alarm, thereby adding unnecessary risk to train operations.

SUMMARY

The present disclosure achieves technical advantages as an avalanche detection system. In one embodiment, the present disclosure comprises an avalanche detection system that reduces instances of false alarms by implementing varying levels of redundancy, as well as implementing mechanical conditional operators in conjunction with sensors and logic to determine if an avalanche has occurred. In another embodiment, the present disclosure provides an avalanche detection system that is cost efficient and practical, increasing the speed in which a railroad system is alerted to avalanche obstruction of railroad tracks.

It is an object of the disclosure to provide an avalanche detection system that is capable of detecting the occurrence of an avalanche that can obstruct a train's movement along railroad tracks. It is another object of the disclosure to provide an impact detection tower capable of reacting only to impacts of certain forces, effectively reducing false alarms due to wildlife, wind, and other weather conditions that cannot apply as much force as, for example, an avalanche. It is another object of the disclosure to provide a method of detecting avalanche interference in a railway system that mitigates the potential for false alarms while being effective and cost efficient.

In one exemplary embodiment, an avalanche detection system includes: a first impact detection tower, the tower comprising: a foundation member; a stanchion member operably coupled to the foundation member, wherein the stanchion member is maintained in an upright position by a conditional operator sensitive to impact forces applied to the stanchion member; a sensor operably coupled to the stanchion member; and a gateway configured to receive data from the sensor to determine whether the stanchion member has moved and the magnitude of such movement. Further comprising a second impact detection tower. The stanchion member further includes a base coupled to the foundation member, the base comprising: a top constituent hingedly coupled to a bottom constituent, wherein the conditional operator controls the operation of a hinge coupled to the top constituent and bottom constituent; and a mast coupled to the top constituent of the base. The sensor is configured to detect a tilt of the stanchion member. The system is configured to signal an alert if the magnitude of the stanchion member movement exceeds a predetermined threshold. Further comprising a human-machine interface (HMI) operably coupled to the gateway. The first impact detection tower is disposed proximate a railroad track.

In another exemplary embodiment, an impact detection tower can include: a foundation member; a stanchion member engaged with the foundation member; and a sensor; wherein the stanchion member is maintained in an upright position by a conditional operator sensitive to impact forces applied to the stanchion member. The stanchion member can include a mast operably coupled to a base, wherein the base is configured to couple the stanchion member to the foundation member. The base can include a top constituent coupled to the mast and a bottom constituent coupled to the foundation member, wherein the conditional operator controls the operation of a hinge connecting the top constituent and the bottom constituent. The sensor can be configured to determine a tilt of the stanchion member. The conditional operator can be a shear pin, or other suitable device. The sensor can be configured to transmit data to a gateway.

Further comprising a reactive stand. The reactive stand can be configured to prevent the stanchion member from tilting beyond 45 degrees. The conditional operator can be configured to release the stanchion member from an upright position when a force exceeding a predetermined operator strength is applied substantially perpendicularly to a vertical axis of the stanchion member.

In another exemplary embodiment, a method of detecting avalanche interference in a railroad system, the method can include the steps of: installing an impact detection tower proximate a railroad track, the impact detection tower can include: a foundation member; a stanchion member engaged with the foundation member; a sensor; and providing a gateway configured to receive data from the sensor to determine whether the stanchion member has moved and the magnitude of such movement. A stanchion member can include a base engaged with the foundation member, the base can include: a top constituent hingedly coupled to a bottom constituent, wherein a conditional operator controls the operation of a hinge coupled to the top constituent and bottom constituent; and a mast coupled to the top constituent of the base. The sensor can be configured to detect a tilt of the stanchion member. The gateway is configured to signal an alert if a tilt of the stanchion member exceeds a predetermined threshold.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
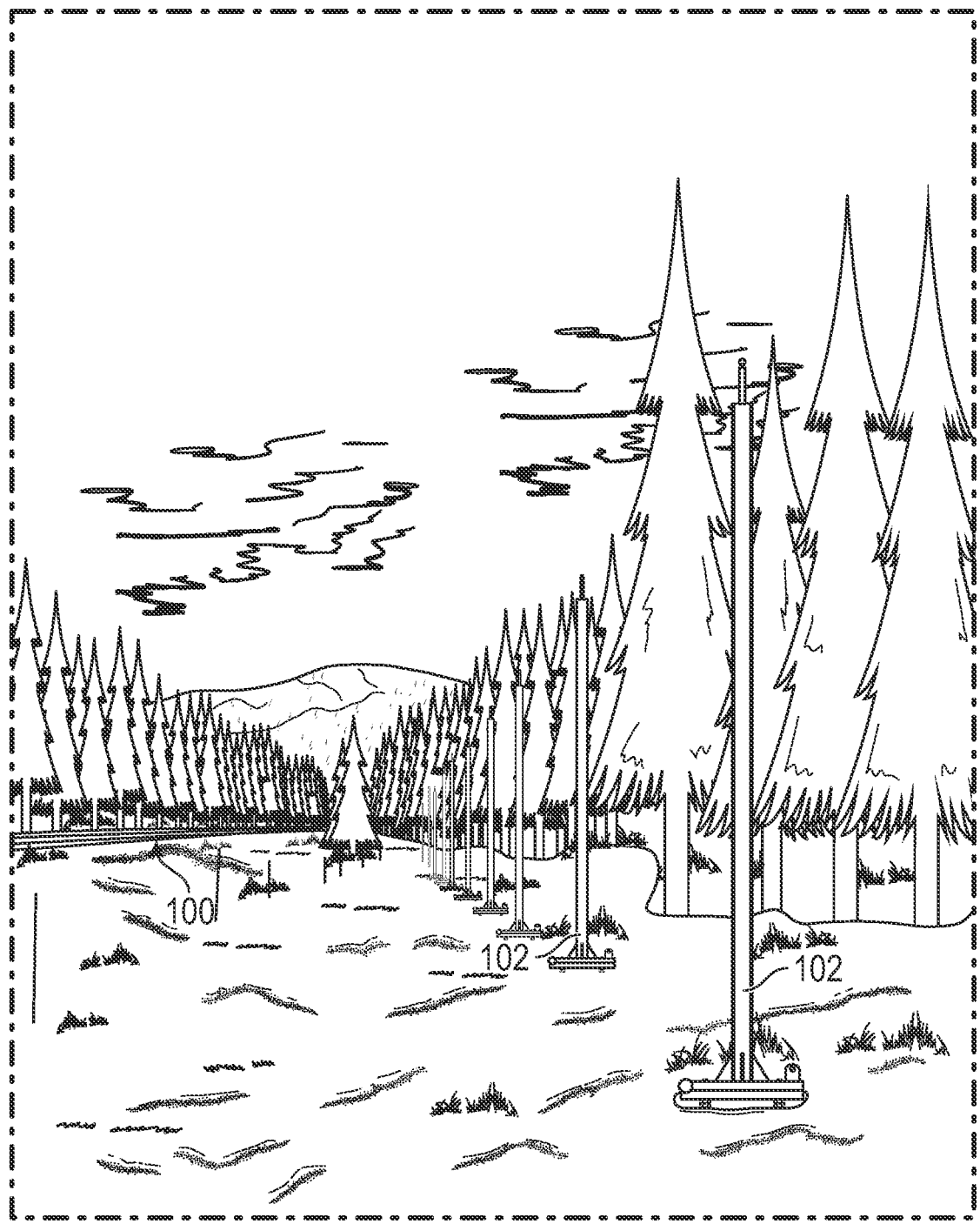
FIG. 1 illustrates an exemplary embodiment of an avalanche detection system, in accordance with the present disclosure.

In one exemplary embodiment, the present disclosure comprises an avalanche detection system. The system can include one or more impact detection towers, each equipped with a sensor configured to collect data related to, for example, the status of the impact detection tower, the current weather conditions, the status of other impact detection towers, or any other information useful in the prediction or detection of avalanches or impacts to the towers. Preferably, and as seen in FIG. 1, the impact detection towers 102 can be disposed along and parallel with a railroad track 100. In one embodiment, the towers 102 can be placed no more than fifty feet from one another, and preferably around twenty-five feet from one another. The sensors of the towers 102 can be configured to communicate data to a gateway (not shown in FIG. 1); in another embodiment, the sensors can be in operable communication with a gateway. In one embodiment, the gateway can be configured to process data from the sensors of the impact detection towers 102 to determine if an alert should be signaled. In another embodiment, an alert can be signaled and communicated to railroad personnel via a human-machine interface (HMI).

The sensors and the gateway can be communicably coupled to each other via a network, such as the Internet, intranet, system bus, or other suitable network, wired or wireless. The communication can be encrypted, unencrypted, over a VPN tunnel, or transmitted over other suitable communication means. The network can be a WAN, LAN, PAN, or other suitable network. Additionally, the sensors and the gateway can form a mesh network. The network communication between the sensors and the gateway, can be encrypted using PGP, Blowfish, AES, 3DES, HTTPS, or other suitable encryption. The network communication can occur via application programming interface (API), ANSI-X12, Ethernet, Wi-Fi, Bluetooth, PCI-Express, USB, Z-WAVE, Zigbee, or other suitable communication protocol. Additionally, databases having obstacle detection or control data can be operably coupled to the system components.

Figure 2A:
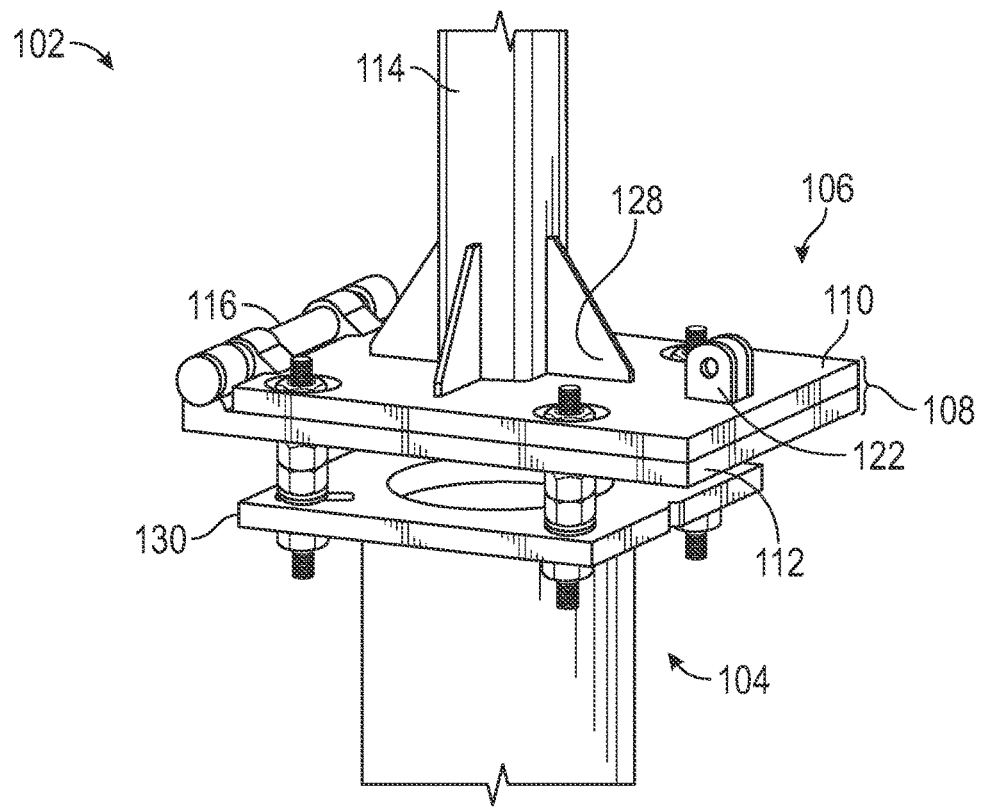
FIGS. 2A and 2B illustrate an exemplary embodiment of an impact detection tower, in accordance with the present disclosure.
Figure 2B:
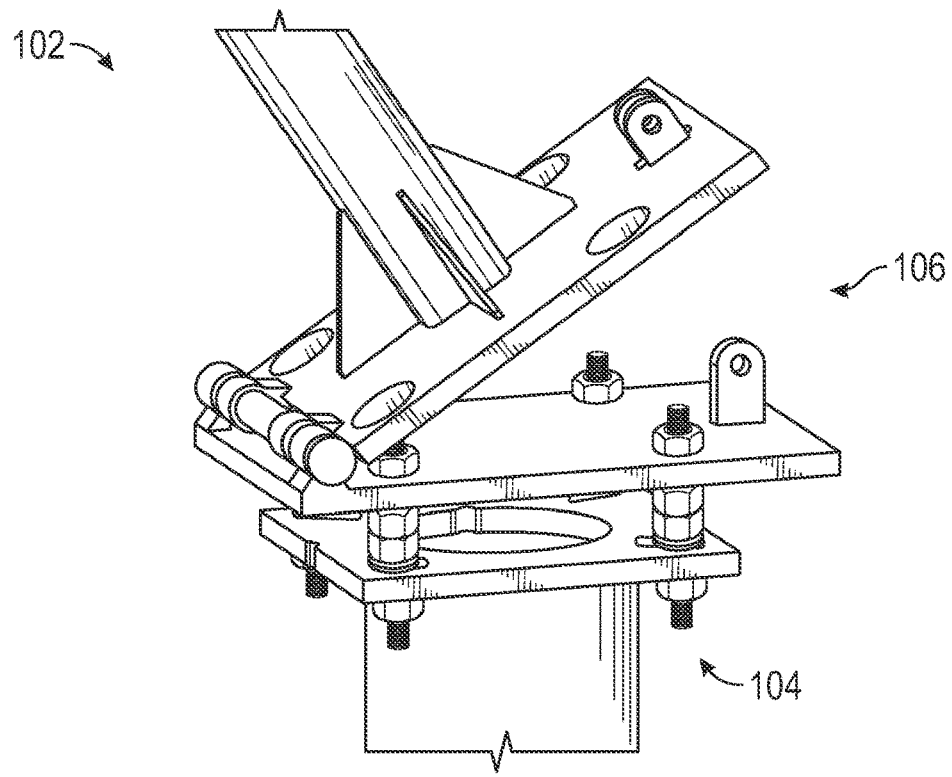

FIG. 2A and FIG. 2B depict an exemplary embodiment of the present disclosure. Preferably, an impact detection tower 102 can include a foundation member 104 and a stanchion member 106. The foundation member 104 can be implemented as any component suitable for coupling to the stanchion member 106 and stabilizing the stanchion member 106 in an upright position. For example, and in one embodiment, the foundation member 104 can be implemented as a slab configured to receive the stanchion member 106. In another exemplary embodiment, the foundation member 104 can be implemented as a support substantially buried in the ground or secured within a slab and configured to receive the stanchion member 106.

In another exemplary embodiment, the stanchion member 106 can comprise a base 108 and a mast 114. Preferably, the base 108 can be configured to couple to the foundation member 104 and support the mast 114. As an example, the base 108 can comprise a top constituent 110 and a bottom constituent 112, wherein the top constituent 110 can be coupled to the mast 114 and the bottom constituent 112 can be coupled to the foundation member 104. The base 108 can be of any suitable shape or configuration to allow it to facilitate the coupling of the mast 114 to the foundation member 104. The mast 114 can also include gussets 128 to increase the stability of the mast.

A conditional operator can control the operation of the hinge 116 coupled to the top constituent 110 and bottom constituent 112. A receiver mechanism 122 can include a male end and a female end, with an area configured to be received the conditional operator. In one exemplary embodiment, the bottom constituent 112 can include a male member, having a member hole therethrough, that can be fed through an opening in top constituent 110. The male member hope can be configured to receive the conditional operator.

In another exemplary embodiment, the top constituent 110 can include one or more guards, having a guard hole therethrough, that can align with the male member of the bottom constituent 112, such that the conditional member can be received through the holes of the male member and the one or more guards. In one embodiment, the foundation member 104 can include a mounting plate 130 that can releasably secure the base 108 to the foundation member 104. The foundation member 104 can be releasably secured to the mounting plate 130 via nuts and bolts, or other suitable components.

Figure 3:
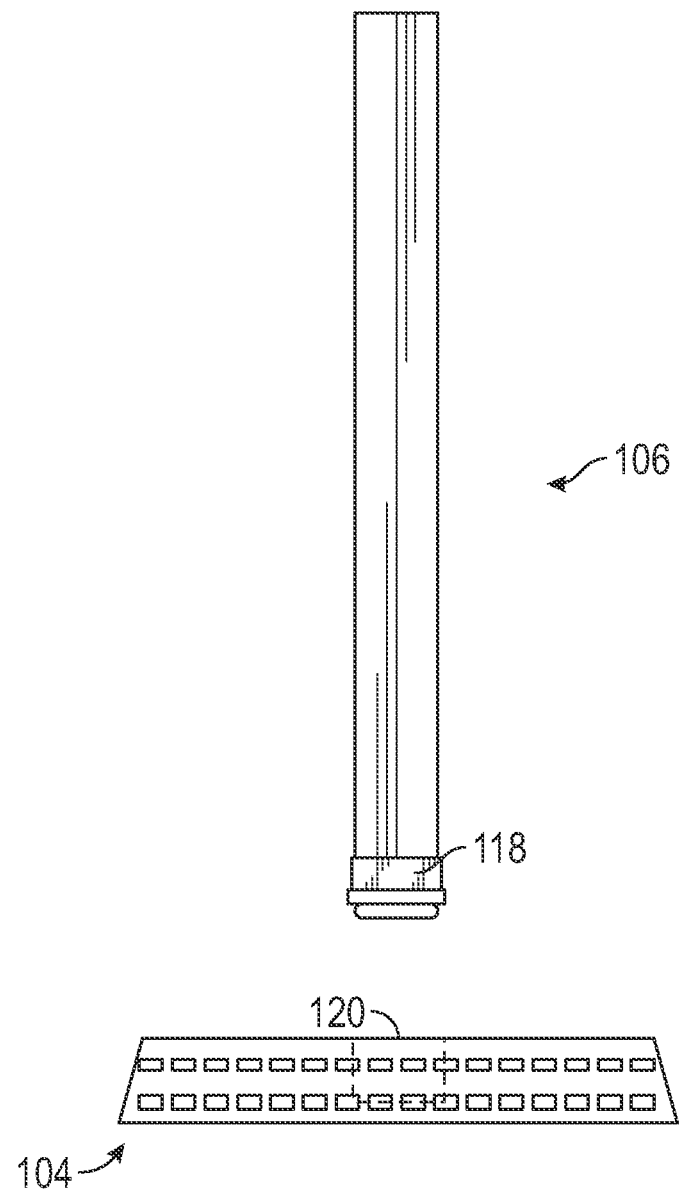
FIG. 3 illustrates another exemplary embodiment of an impact detection tower, in accordance with the present disclosure.

As illustrated in FIG. 3, the stanchion member 106 can also be coupled directly to the foundation member 104. In one embodiment, the foundation member 104 can include a slab with an orifice 120 configured to receive an end 118 of the stanchion member 106; the stanchion member end 118 can preferably be the male counterpart, and the foundation member orifice 120 can preferably be the female counterpart, of a male-female connection scheme. It will be understood by those skilled in the art that there are a variety of designs and configurations available to facilitate the coupling of the stanchion member end 118 within the foundation member orifice 120. In one embodiment, the stanchion member end 118 can comprise threads, and the foundation member orifice 120 can comprise corresponding threads configured to receive the stanchion member end 118 threads. In another embodiment, the foundation member orifice 120 can be configured to tightly receive the stanchion member end 118, and the end 118 can be beveled and corrugated to facilitate insertion of the end 118 into the orifice 120, such that the stanchion member 106 can be "snapped" into place within the foundation member 104. Any other suitable male-female-type attachment scheme may be utilized to facilitate the coupling of the stanchion member 106 to the foundation member 104.

In one embodiment, the impact detection tower 102 can preferably be configured such that the stanchion member 106 can topple over when impacted with sufficient force. For example, the stanchion member 106 can be releasably coupled to the foundation member 104 such that sufficient force can decouple the stanchion member 106 from the foundation member 104. Such force can be predetermined via historical data, modeling, or other suitable method. Alternatively, the stanchion member 106 can be operably engaged with the foundation member 104 to allow the stanchion member 106 to topple while remaining coupled to the foundation member 104. In an exemplary embodiment, the stanchion member 106 and foundation member 104 can be hingedly engaged such that the stanchion member 106 is movable around the axis of the hinge, enabling the stanchion member 106 to fall over while remaining attached to the foundation member 104. In another embodiment, the stanchion member 106 can comprise a base 108 with a top constituent 110 and a bottom constituent 112, and a hinge 116 can be disposed between the constituents 110, 112. As an example, and as illustrated in FIG. 2B, in this manner, the stanchion member 106 can remain coupled to the foundation member 104 via the bottom constituent 112 of the base 108 but topple when hit with sufficient force.

In one exemplary embodiment, the stanchion member 106 of the impact detection tower 102 can be configured to only topple when impacted with sufficient force, as controlled by a conditional operator. The conditional operator can be utilized to maintain the stanchion member 106 in an upright position, such that when a condition is met (i.e. an impact of predetermined force), the conditional operator can function to allow the stanchion member 106 to topple. In one embodiment, and as seen in FIG. 2, the conditional operator can preferably be a shear pin that can control the operation of the hinge 116. The shear pin can be designed to prevent operation of the hinge 116 until a predetermined force is applied to the tower 102. The tensile strength of the shear pin can be selected such that once the predetermined force is applied to the tower, the shear pin will fail and allow the hinge to operate. Multiple types of conditional operators can be utilized to accomplish this function, including friction devices, springed devices, or other suitable devices. In one embodiment, the conditional operator can be a magnet configured to separate only upon application of sufficient force to the tower 102. In another embodiment, the conditional operator can function like a door latch, only releasing upon application of sufficient force. Any suitable component can be utilized to accomplish the conditional upright position of the stanchion member 106. In one embodiment, the conditional operator is configured to release the stanchion member from an upright position when a force exceeding a predetermined operator strength is applied substantially perpendicularly to a vertical axis of the stanchion member. In one exemplary embodiment, the stanchion member can be positioned such that the hinge is opposite the side of initial impact, such as facing away from the rail road or positioned between the railroad tracks and the avalanche threat, such that an impact from an avalanche will cause the hinge to operate and cause the tower to topple.

The coupling mechanism between the foundation member 104 and stanchion member 106 can also be configured to act as a conditional operator. For example, with respect to FIG. 3, the stanchion member end 118 and foundation member orifice 120 can be configured to decouple upon application of sufficient force to the stanchion member 106. In one embodiment, the threads of the stanchion member end 118 and foundation member orifice 120 can be designed to give way when the stanchion member 106 is impacted with a certain force. In another embodiment, a beveled and corrugated end 118 can release from the orifice 120 upon impact of a similar force. It will also be understood by those having skill in the art any suitable male-female-type attachment mechanism can be configured to act as a conditional operator and allow the stanchion member 106 to separate from the foundation 104 upon application of a predetermined force. In another embodiment, the hinged engagement of the stanchion member 106 with the foundation member 104 (or the hinge 116 connecting the top constituent 110 and bottom constituent 112 of the base 108) can be configured to only operate when sufficient force is applied, such as through a design increase in friction, thereby acting as a conditional operator in-and-of itself. In another embodiment, the stanchion member 106 itself can act as the conditional operator. For example, someone having skill in the art will understand that the stanchion member 106 can be made of a material designed to break upon application of a certain level of force, and upon breaking, the stanchion member 106 would no longer be in an upright position. In this manner, and as an example, the material of the stanchion member 106, the material of the foundation member 104, and/or the material of the attachment mechanism used to couple the stanchion member 106 to the foundation member 104 (for example, nuts and bolts, rivets, threads, or any other suitable attachment mechanism) can be the conditional operator.

Figure 4:
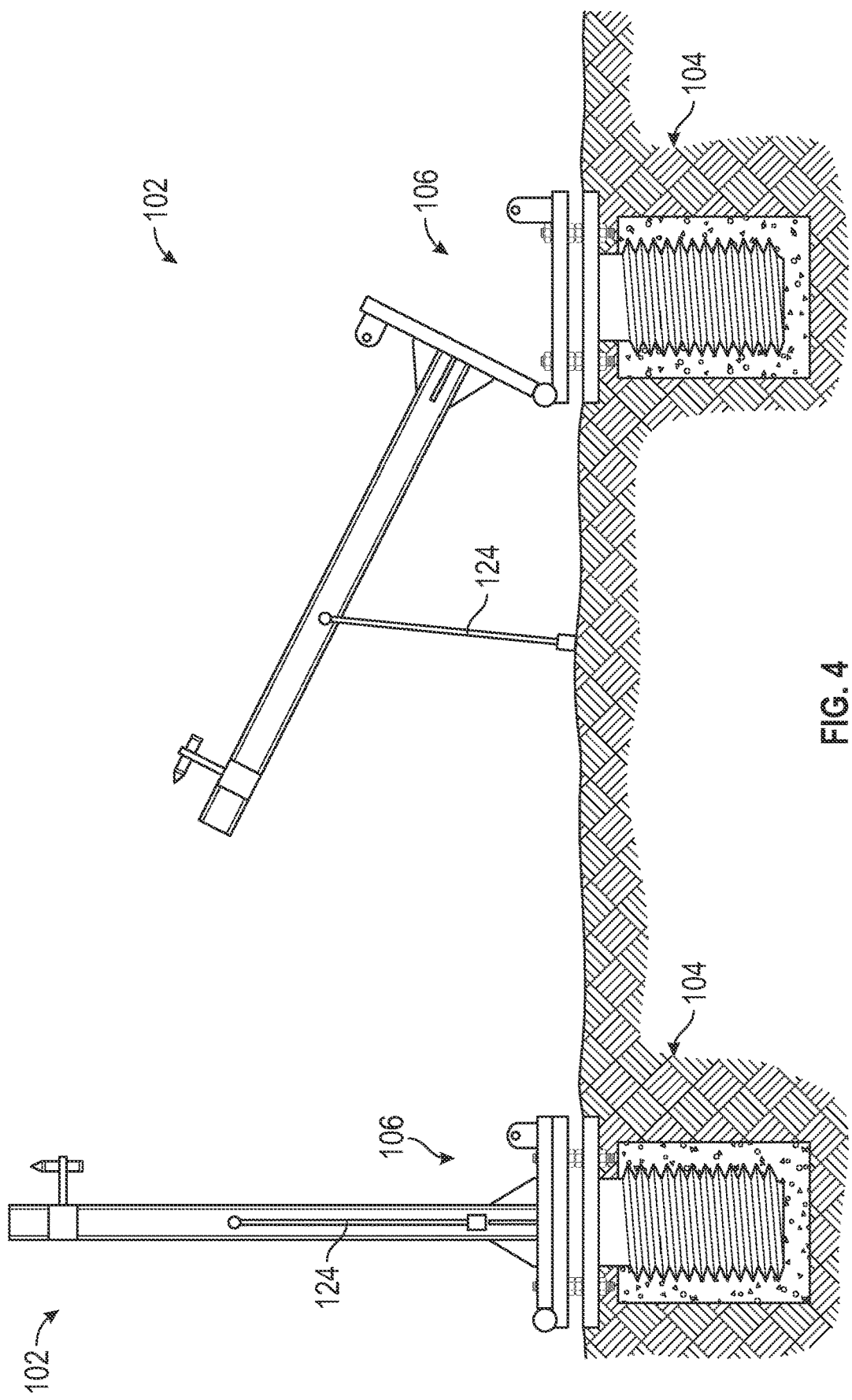
FIG. 4 illustrates another exemplary embodiment of an impact detection tower, in accordance with the present disclosure.

FIG. 4 depicts another embodiment of the present disclosure, wherein a reactive stand 124 can be disposed on the stanchion member 106 of the impact detection tower 102. In one embodiment, the stand 124 can be configured to extend when the stanchion member 106 begins to topple, or when a force is applied to the tower 102. In another embodiment, the stand can be configured to extend commensurate with the toppling of the stanchion member 106. The stand 124 can be made to be reactive to an impact to the tower 102 by being spring-loaded, connecting to a pulley-type system, or otherwise being mechanized or actuated to react to an impact or movement by the stanchion member 106 by any other suitable component or mechanism.

Figure 5:
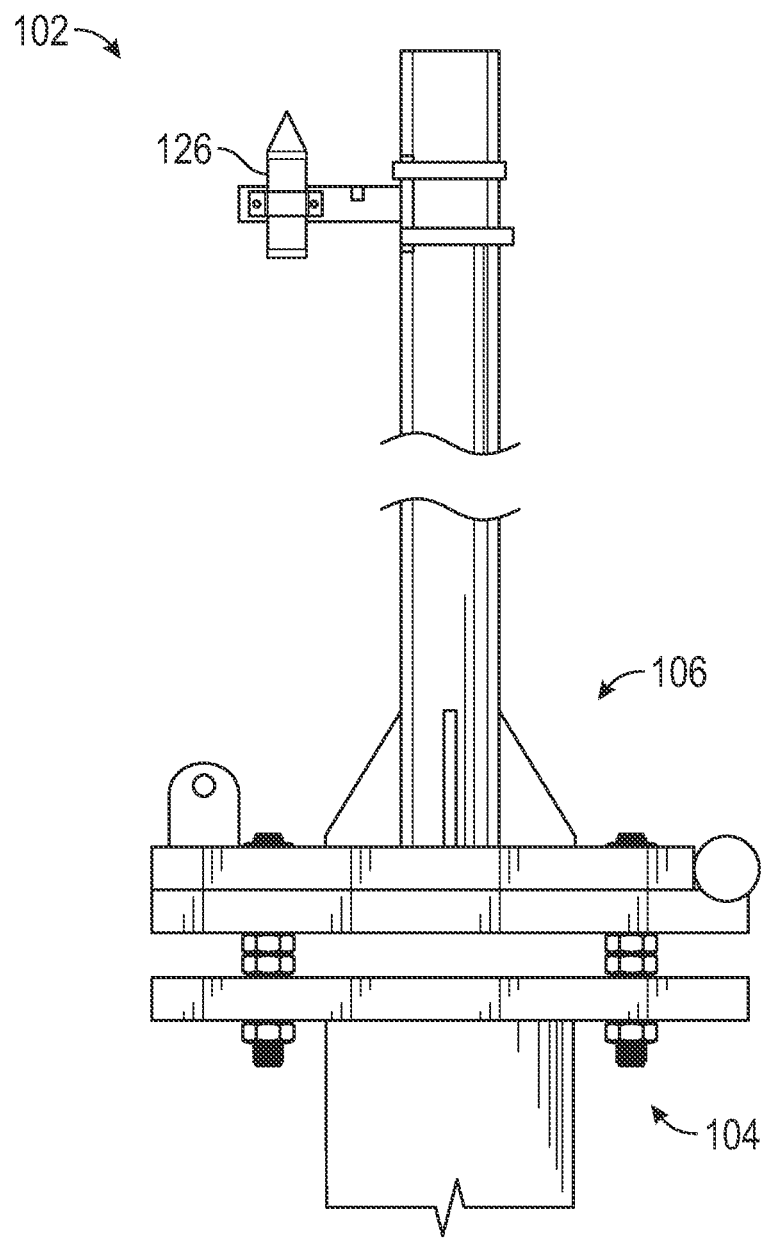
FIG. 5 illustrates another exemplary embodiment of an impact detection tower, in accordance with the present disclosure.

FIG. 5 illustrates another exemplary embodiment of the present disclosure, wherein the impact detection tower 102 comprises a sensor 126. In one embodiment, the sensor is disposed near the top of the stanchion member 106. It will be understood by those having skill in the art that the sensor 126 can be configured to collect a variety of data, including temperature, wind speed, elevation, vibrational frequencies, radio frequencies, motion indications, and any other data potentially useful to railroad operators. It will also be understood by those having skill in the art that the sensor 126 can be equipped with a number of components to facilitate such data collection, including, but not limited to, accelerometers, gyroscopes, magnetometers, GPS, proximity sensors, ambient light sensors, microphones, speakers (to, for example, emit a sound to assist in the location of the sensor), barometers, thermometers, and air humidity sensors. In a preferred embodiment, the sensor 126 can comprise an accelerometer operable to detect a tilt of the impact detection tower 102. In another embodiment, the sensor 126 can be configured to detect vibrations in the tower 102. In another embodiment, the sensor 126 can be configured to detect angular and/or lateral speed and acceleration of stanchion member 106. The sensor 126 can be made to be resistant to a myriad of weather conditions or to be waterproof or airtight. In a another embodiment, the sensor 126 can be configured to output data that it collects in real-time (lower than 500 millisecond latency) to a gateway. It will be understood by those in the art that the sensor 126 can output data via a myriad of communication methods, including radio frequencies, Ethernet, or any other suitable communication method.

In one embodiment, the gateway is configured to receive data from the sensor(s) 126 and determine if an alert should be signaled based on this data. For example, the gateway can comprise a processor with access to memory. In another embodiment, the gateway can be implemented via one or more servers having a memory. The server can be implemented in hardware, software, or a suitable combination of hardware and software therefor, and can comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server(s). Additionally, the server can include memory.

Memory can comprise electronic storage that can include non-transitory storage media that electronically stores information. The electronic storage media of electronic storage can include one or both of system storage that can be provided integrally (i.e., substantially non-removable) with server(s) and/or removable storage that can be removably connectable to server(s) via, for example, a port (e.g., a USB port, a firewire port, etc.) or a drive (e.g., a disk drive, etc.). Electronic storage can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage can include one or more virtual storage resources (e.g., cloud storage, a virtual private network, and/or other virtual storage resources). Electronic storage can store machine-readable instructions, software algorithms, information determined by processor(s), information received from server(s), information received from computing platform(s), and/or other information that enables server(s) to function as described herein. The electronic storage can also be accessible via a network connection.

Processor(s) can be configured to provide information processing capabilities in server(s). As such, processor(s) can include one or more of a digital processor, an analog processor, a digital circuit designed to process information, an analog circuit designed to process information, a state machine, and/or other mechanisms for electronically processing information, such as FPGAs or ASICs. The processor(s) can be a single entity or include a plurality of processing units. These processing units can be physically located within the same device, or processor(s) can represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server can be configured with machine-readable instructions having one or more functional modules. The machine-readable instructions can be implemented on one or more servers, having one or more processors, with access to memory. The machine-readable instructions can be a single networked node, or a machine cluster, which can include a distributed architecture of a plurality of networked nodes. The machine-readable instructions can include control logic for implementing various functionality, as described in more detail below. The machine-readable instructions can include certain functionality associated with the gateway and data the gateway receives from the sensor(s) 126, as well as functionality associated with the gateway interfacing with any existing railway management systems or programs.

In one exemplary embodiment, the gateway can be configured to receive data from the sensor(s) 126 and utilize the data in its logic to determine if an alert should be signaled. For example, the sensor(s) 126 can communicate (and/or the gateway can elucidate) a number of sensor-related statuses to assist the gateway in deciding if it should signal an alert or not: a connection status (e.g. CONNECTED or NOT CONNECTED, with the NOT CONNECTED status determined by the gateway recognizing that transmissions are not being received from the sensor); a battery status (i.e., for example, CRITICAL, LOW, MEDIUM, HIGH, or communicated as a percentage), and a tilt status (i.e. an angular measurement of the tilt of the stanchion member relative to an initial calibration of the sensor determined upon installation of the tower). In an exemplary embodiment, if one or more sensors are NOT CONNECTED, the gateway can signal, for example, an avalanche alert. Alternatively, if one or more sensors communicates a tilt status of, for example, more than twenty degrees relative to the calibration, the gateway can signal avalanche detection alert. In another embodiment, if one or more sensors communicates a LOW or CRITICAL battery status, the gateway signal an avalanche detection alert. In another embodiment, the gateway can be configured to signal different types of alerts based on the statuses communicated to it by the sensor(s).

The gateway (and information and alerts promulgated and elucidated by the gateway) can be integrated into railroad management in a multitude of ways. In one embodiment, the gateway can be in operable communication with a railroad dispatch system, or with any other system utilized in railway management. For example, a railroad worker can receive information directly from the gateway and relay it to a railway control system, which can alert the control system or engineers of individual locomotives. In another embodiment, the gateway automatically signals an alert to engineers in individual locomotives. The gateway can signal an alert to the system it is connected to via any communication means known in the art. Preferably, the gateway can be operably connected to an HMI that can display the statuses of the sensor(s) 126 and alerts from the gateway. The HMI can comprise a touchscreen, a screen and keyboard, or any other suitable components to enable a person to interface with the gateway and/or connected systems. In an exemplary embodiment, a railroad worker can utilize the HMI to monitor the avalanche detection system as a whole, as well as the individual impact detection towers. The HMI can additionally be used to facilitate connection and communication with an overarching railway management system. Alternatively, the gateway can directly connect and communicate with a railway management system without an HMI. In one embodiment, the gateway and/or HMI can be configured to perform a logging capability, such that past statuses transmitted by the sensor(s) can be archived and accessed as necessary by railroad management.

In another exemplary embodiment, the gateway can be located up to two thousand meters away from the impact detection tower 102, and the sensor(s) 126 can transmit data to the gateway via radio waves. In one embodiment, the sensor(s) 126 can transmit, and the gateway can receive, at a frequency of 900 MHz. The gateway can preferably be housed in an insulated structure near the track, but away from areas at risk of avalanche damage. In another embodiment, the sensor(s) 126 can further be configured to receive data and/or instructions from the gateway and/or connected HMI, such that the sensor(s) are in operable communication with the gateway and/or HMI. For example, and as a non-limiting embodiment, a railroad worker, via the HMI, could instruct a sensor to recalibrate, reset, or perform some other function relevant to the impact detection tower or avalanche detection system.

Figure 6A:
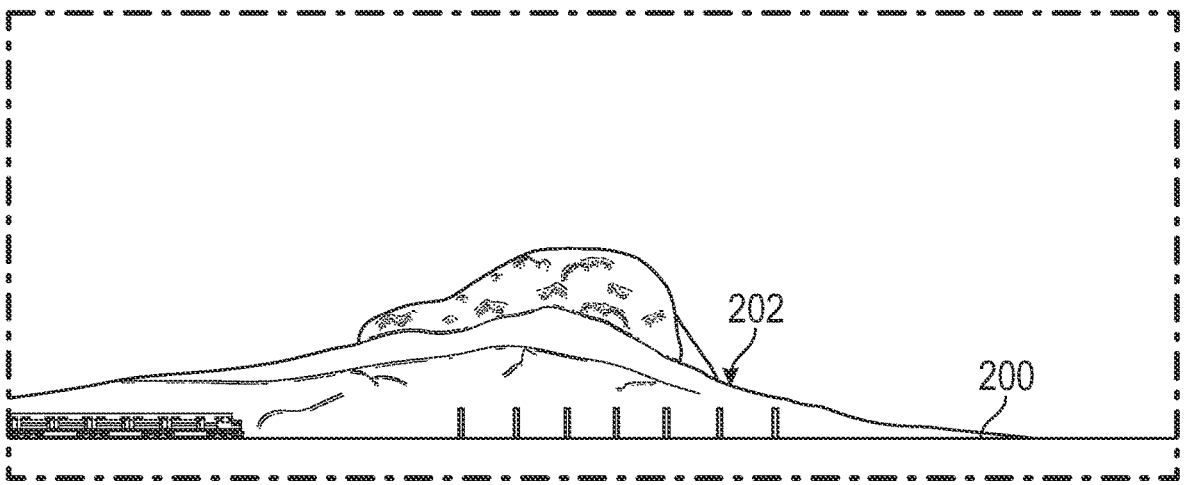
FIGS. 6A, 6B, and 6C illustrate an exemplary embodiment of an avalanche detection system, in accordance with the present disclosure.
Figure 6B:
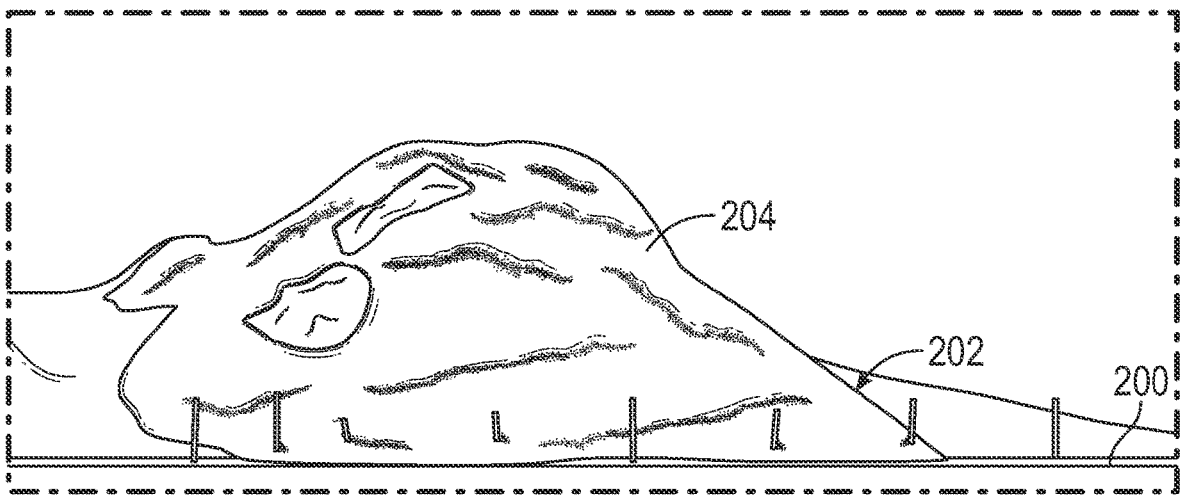
Figure 6C:
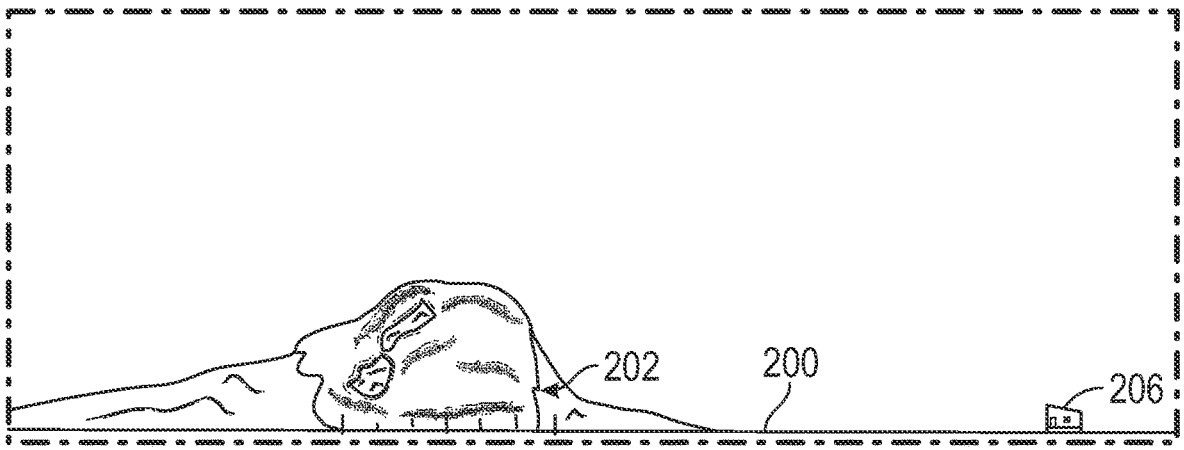

FIGS. 6A, 6B, and 6C illustrate an exemplary embodiment of the present disclosure. FIG. 6A depicts a railroad track 200 laid in an area at risk of avalanche damage. A plurality of impact detection towers 202 designed in accordance with the present disclosure can disposed parallel with the track 200 between the track 200 and potential avalanche (due to obvious elevation considerations, one having skill in the art will recognize from which direction an avalanche could come). FIG. 6B depicts the occurrence of an avalanche 204, wherein the slurry impacts several impact detection towers 202 and obstructs the track 200. In one embodiment, some of the towers 202 tilt beyond a certain predetermined angle, and this tilt status is communicated to the gateway 206 depicted in FIG. 6C. The gateway 206 receives this status and determines via its logic that it should signal an alert. The gateway 206 signals this alert to the railroad dispatch or control system to warn engineers of locomotives and initiate protocols to remove the obstruction and fix any damage to the track. Alternatively, an HMI in operable connection with the gateway 206 displays the avalanche alert to railroad personnel who can take appropriate action.

The impact detection towers described in the present disclosure can be oriented appropriately to maximize effectiveness in detecting impacts. It will also be appreciated that the logic of the gateway can be configured to signal alerts upon the occurrence of any combination of events or data communicated from the sensors, and the gateway can additionally be configured to signal different alerts for different occurrences. In an exemplary embodiment, the gateway signals an avalanche detection alert when two or more adjacent towers communicate a tilt status meeting or exceeding a certain threshold; in one embodiment, this threshold is twenty degrees. In another embodiment, if two or more towers cease communication with the gateway, the gateway can signal an alert. Alternatively, if two or more gateways transmit a low battery status, the gateway can signal an alert. It will also be appreciated that the sensor(s) and gateway can be configured to detect impacts via other data, such as vibration readings from the tower, or the speed in which the tower topples over.

The present disclosure achieves at least the following advantages:

1. provides an avalanche detection system capable of detecting the occurrence of an avalanche that could obstruct a train's movement along railroad tracks;
2. reduces instances of false alarms in avalanche detection;
3. provides an avalanche detection system that is cost efficient and practical; and
4. increases the speed in which a railroad system is alerted to avalanche obstruction.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims. In particular, the integration of commercial-off-the-shelf (COTS) equipment may be utilized in the new and unconventional manner described herein.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An avalanche detection system, comprising:
   a plurality of impact detection towers configured to detect an avalanche, each impact detection tower comprising:
      a stanchion member having a mast hingedly coupled to a base, the mast maintained in an upright position by a conditional operator adapted to control the operation of the hinge; and
      a sensor operably coupled to the stanchion member; and
   a gateway configured to receive data from the sensor to determine a magnitude of the stanchion member's movement,
   wherein the avalanche detection system is operable to detect an avalanche based upon the magnitude of the stanchion member's movement.

2. The system of claim 1, further comprising a reactive stand configured to extend when the impact detection tower begins to topple.

3. The system of claim 1, wherein the sensor is configured to detect a tilt of the stanchion member.

4. The system of claim 1, wherein the system is configured to signal an alert if the magnitude of the impact detection tower movement exceeds a predetermined threshold.

5. The system of claim 1, further comprising a human-machine interface (HMI) operably coupled to the gateway.

6. The system of claim 1, wherein the sensor determines the angular or lateral speed and acceleration of the stanchion member.

7. The system of claim 1, wherein the avalanche detection system is disposed proximate a railroad track.

8. An impact detection tower, comprising:
   a stanchion member having a mast hingedly coupled to a base, the mast maintained in an upright position by a conditional operator adapted to control the operation of the hinge; and
   a sensor operably coupled to the stanchion member and configured to collect data related to the status of the impact detection tower,
   wherein the sensors can indicate the presence of an avalanche proximate the impact detection tower based upon the collected data.

9. The impact detection tower of claim 8, wherein the stanchion member comprises a mast operably coupled to a base, wherein the base is configured to couple the stanchion member to a foundation member.

10. The impact detection tower of claim 9, wherein the base includes a top constituent coupled to the mast and a bottom constituent coupled to the foundation member, wherein the conditional operator controls the operation of a hinge connecting the top constituent and the bottom constituent.

11. The impact detection tower of claim 8, wherein the sensor is configured to determine a tilt of the stanchion member.

12. The impact detection tower of claim 8, wherein the conditional operator is a shear pin.

13. The impact detection tower of claim 8, wherein the sensor is configured to transmit data to a gateway.

14. The impact detection tower of claim 8, further comprising a reactive stand.

15. The impact detection tower of claim 14, wherein the reactive stand is configured to prevent the stanchion member from tilting beyond 45 degrees.

16. The impact detection tower of claim 8, wherein the conditional operator is configured to release the stanchion member from an upright position when a force exceeding a predetermined operator strength is applied substantially perpendicularly to a vertical axis of the stanchion member.

17. A method of detecting avalanche interference in a railroad system, comprising:
   receiving data from a sensor coupled to a stanchion member disposed proximate a railroad track related to the movement of the stanchion member, wherein the stanchion member includes a mast hingedly coupled to a base;
   detecting an avalanche, via a gateway, if the stanchion member movement exceeds a predetermined threshold; and
   generating an alert using at least a portion of the received data.

18. The method of claim 17, wherein the mast maintained in an upright position by a conditional operator adapted to control the operation of the hinge.

19. The method of claim 17, wherein the sensor is configured to detect a tilt, angular or lateral speed, or acceleration of the stanchion member.

20. The method of claim 17, wherein the conditional operator is a shear pin.

* * * * *